(12) United States Patent
Rangineni et al.

(10) Patent No.: US 12,526,678 B2
(45) Date of Patent: Jan. 13, 2026

(54) MANAGING DATA TRANSFERS IN WIRELESS CONNECTIONS USING CONNECTION EVENT LENGTHS

(71) Applicant: Cypress Semiconductor Corporation, San Jose, CA (US)

(72) Inventors: Balasubramanyam Rangineni, San Diego, CA (US); Manamohan Mysore, Ramona, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 447 days.

(21) Appl. No.: 18/095,410

(22) Filed: Jan. 10, 2023

(65) Prior Publication Data
US 2024/0236738 A1    Jul. 11, 2024

(51) Int. Cl.
*H04W 24/10* (2009.01)
*H04L 43/0882* (2022.01)
*H04L 43/0894* (2022.01)

(52) U.S. Cl.
CPC ......... *H04W 24/10* (2013.01); *H04L 43/0882* (2013.01); *H04L 43/0894* (2013.01)

(58) Field of Classification Search
None
See application file for complete search history.

(56) References Cited

U.S. PATENT DOCUMENTS

2017/0187828 A1* 6/2017 Soji .......................... H04L 67/62
2023/0422010 A1* 12/2023 Alpert ................... H04W 76/15

FOREIGN PATENT DOCUMENTS

WO    WO-2022090059 A1 *  5/2022  ............. H04B 1/713

* cited by examiner

*Primary Examiner* — Angela Nguyen

(57) ABSTRACT

Implementations disclosed include techniques and systems that include obtaining a connection event length for a wireless connection associated with a plurality of devices. The techniques and systems further include adjusting, using the connection event length, a parameter characterizing a quality of the wireless connection.

20 Claims, 5 Drawing Sheets

MANAGING DATA TRANSFERS IN WIRELESS CONNECTIONS USING CONNECTION EVENT LENGTHS

TECHNICAL FIELD

The present disclosure pertains to wireless networks and more specifically, to managing data transfers in wireless connections using connection event lengths of various electronic devices communicating wirelessly, e.g., via a Bluetooth (BT) or Bluetooth® Low Energy (BLE) connection.

BACKGROUND

Personal area networks (PANs), such as Bluetooth® (BT), Bluetooth® Low Energy (BLE), Zigbee®, infrared, etc., networks provide wireless connections for various personal industrial, scientific, and medical applications. PANs generally use a packet-based protocol and have an architecture that includes central devices (CDs) and peripheral devices (PDs). A CD can communicate with multiple PDs.

Bluetooth Low Energy (BLE) networks have communication ranges that are similar to that of BT networks but have a considerably smaller power consumption and cost. Data can be transferred between a CD and a specific PD during a time allocated for the specific PD-CD communication link. At a designated time, a PD can tune in to receive messages and data from the CD and, in turn, communicate data to the CD. Additionally, BLE architecture can define different roles for BLE devices such as a broadcaster and/or an advertiser to broadcast data to multiple synchronizers and/or scanners. BLE devices often remain in a sleep mode and transition to an active mode when data communication is about to happen. BLE specification supports a number of physical (PHY) layers capable of facilitating different maximum transmission rates. BLE protocol also supports mesh networking, in which data can flow over multiple paths, and which does not rely on a rigid hierarchical structure of devices, often allowing the same devices to serve as CDs or PDs, depending on particular network conditions and topology.

DETAILED DESCRIPTION

Figure 1:
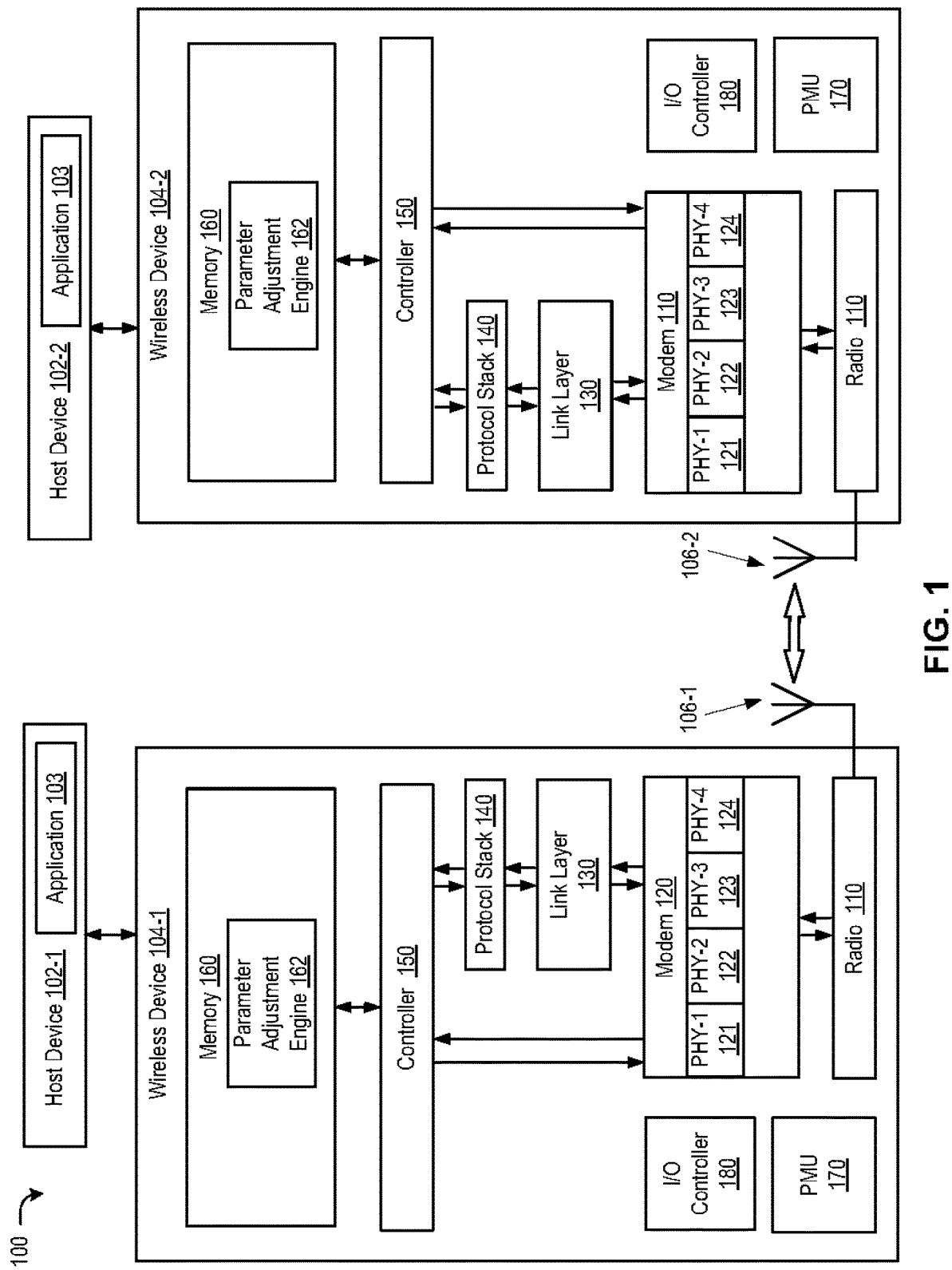
FIG. 1 is a block diagram of an example system for managing data transfers in wireless connections using connection event lengths between a wireless device acting as a CD and a wireless device acting as a PD, in accordance with some implementations.

Wireless BLE devices (also referred to herein as BLE devices, BLE wireless devices, wireless devices, and the like) (or any other personal area network devices) often provide wireless connectivity to a host device. For example, a desktop computer (a first host) may be using its BLE wireless device to stream audio (or video) files to a smartphone (a second host) that deploys another BLE wireless device. Each wireless device may include antennas (e.g., 2.4 GHz antennas), radio components, PHY and link layers, a protocol stack, a memory, and a processing device (e.g., central processing unit or a microcontroller) and may transform digital data packets used by the host into radio signals that can be communicated to other BLE devices over the air. A connection event between BLE wireless devices can refer to each data packet transfer event between one BLE wireless device and another BLE wireless device. Certain BLE devices can support certain connection intervals, where each connection interval specifies a period of time reserved for data packet transfer events between the BLE wireless devices. Certain BLE devices also specify connection event lengths, which are set by BLE devices serving as central devices (CDs), where each connection event length refers to a time within each connection interval during which a BLE device can be active (e.g., it can send or receive data packets).

Generally, there can often be packet (e.g., data) loss, packet latency, decreased throughput, over-the-air (OTA) bandwidth under-utilization, etc., due to various conditions affecting the quality of an established wireless link, such as intervening physical barriers, signal interference from other connected devices, changed mutual locations of the wireless devices, other changing environmental conditions, etc. The host, however, may not be cognizant of the changing conditions. The information about the quality of the wireless link, such as throughput, packet latency, packet loss, and the like, may be available to a wireless controller (e.g., of each of the BLE wireless devices), but the wireless controller may not be configured to provide such information to the host or to make use of the information to improve the quality of the wireless link. Certain BLE devices can improve the quality of the wireless link, such as throughput and OTA bandwidth utilization, by choosing (e.g., setting and/or adjusting) certain parameters that can affect (e.g., improve) the quality of the wireless link. For example, certain BLE devices can set and/or adjust the connection event length, the connection interval, the PHY, etc. Adjusting the connection event length supported by BLE devices can improve the efficiency of scheduling/aligning links between the BLE devices, thus avoiding collisions between connection events of the BLE devices. However, BLE devices in the link/PAN often do not know the values of the parameters, such as the connection event length supported. As a result, scheduling conflicts often lead to collisions (e.g., packet drops), which can often result in a decrease in throughput and/or OTA bandwidth under-utilization.

Aspects and implementations of the present disclosure address these and other limitations of the existing technology by enabling systems and methods of managing data transfers in wireless connections using connection event lengths that can be exchanged between wireless devices and used to adjust parameters affecting the quality of the wireless connection. In some implementations, a wireless controller can obtain a connection event length for a wireless connection for a central device and a peripheral device. The wireless controller can adjust a parameter using the connection event length to improve a quality of the wireless connection. In some implementations, the parameter can be an OTA bandwidth utilization rate, and adjusting the parameter can increase the OTA bandwidth utilization rate. In some implementations, the wireless controller can adjust the parameter by adjusting a maximum data length that is set for the central device and/or peripheral device for transmitting and/or receiving data over the wireless connection, where the maximum data length is within the obtained connection event length. For example, the wireless controller can reduce the maximum data length such that a data packet of a reduced size can be transmitted and/or received over the wireless connection. In some implementations, the wireless controller can adjust a timing for a wireless link of the peripheral device based on a determined threshold offset between the timing for the wireless link of the peripheral device and a timing for a wireless link of the central device, such that the wireless link of the peripheral device and the wireless link of the central device can avoid a collision. In some implementations, the wireless controller can create a new wireless link for the peripheral device based on the determined threshold offset, such that the wireless link of the peripheral device and the wireless link of the central device can avoid a collision. In some implementations, the wireless controller can adjust the wireless link of the central device based on the determined threshold offset, such that the wireless link of the peripheral device and the wireless link of the central device can avoid a collision. In some implementations, the wireless controller can identify one or more connection events between the central device and the peripheral device. The wireless controller can adjust the timing of each of the identified connection events, e.g., by adjusting the timing of each connection event by a period of time (e.g., one or more microseconds) for each connection event such that the wireless link between the peripheral device and the wireless link of the central device can be aligned and thus avoid any collisions. Numerous other implementations and multiple variations of these implementations are discussed below.

Advantages of the present disclosure may include an improvement in the OTA bandwidth utilization of wireless connections between wireless devices, an increase in the throughput of data transfers over wireless connections between wireless devices, and an overall improvement in the system. By obtaining the connection event length and adjusting the timing of links between connection events of the wireless devices using the connection event length, there can be fewer packet drops due to collisions from misaligned links. Instead, packet drops can be reduced, leading to increased throughput and better OTA bandwidth utilization.

FIG. 1 is a block diagram of an example system for managing data transfers in wireless connections using connection event lengths between a wireless device acting as a CD and a wireless device acting as a PD, in accordance with some implementations. Wireless system 100 may be a BT network, a BLE network, or any other type of a personal area network. Wireless system 100 may include any number of host devices 102-$n$. A host device 102-$n$ may be any desktop computer, laptop computer, tablet, phone, smart TV, sensor, appliance, system controller (e.g., an air conditioning, heating, water heating controller), component of a security system, medical testing, monitoring equipment, or any other type of a device. Each of the host devices 102-$n$ may be coupled (e.g., via a wired and/or wireless connection) to a respective wireless device 104-$n$. For brevity, shown are two wireless devices 104-1 and 104-2, but it should be understood that wireless system 100 may include any number of such wireless devices. Wireless system 100 may be configured with any of the network devices 104-1 designated as a central device or a peripheral device. In some implementations, wireless device 104-1 and/or wireless device 104-2 may be implemented as an integrated circuit (IC) device (e.g., disposed on a single semiconductor die). Various modules and components of wireless device 104-1 and/or wireless device 104-2 are denoted with the same numbers, but it should be understood that such modules and components may be implemented in wireless device 104-1 and wireless device 104-2 using different hardware and software platforms. Some modules and components may be absent.

Wireless device 104-1 may use one or more antennas 106-1, and wireless device 104-2 may use one or more antennas 106-1, to receive and transmit radio waves. A signal received by a respective antenna 106-$n$ may be processed by radio 110 which may be a module that includes filters (e.g., band-pass filters), low-noise radio-frequency amplifiers, down-conversion mixer(s), intermediate-frequency amplifiers, analog-to-digital converters, inverse Fourier transform modules, deparsing modules, interleavers, error correction modules, scramblers, and other (analog and/or digital) circuitry that may be used to process modulated signals received by antenna(s) 106-$n$. Radio 110 may provide the received (and digitized) signals to a modem 120. Modem 120 may include multiple PHY layer components, e.g., PHY 121-124. Although four PHY layer components are shown, modem 120 may include any suitable number of PHY layers (supporting a respective number of operation modes). A PHY layer component may convert the digitized signals received from radio module 110 into frames that can be fed into a Link Layer 130. Link Layer 130 may have a number of states, such as advertising, scanning, initiating, connection, and standby. Link Layer 130 may transform frames into data packets. During transmission, data processing may occur in the opposite direction, with Link Layer 130 transforming data packets into frames that are then transformed by one of PHY 121-124 into digital signals provided to radio 110. Radio 110 may convert digital signals into radio signals and transmit the radio signals using antennas 106-$n$. In some implementations, radio 110, PHY 121-124, and Link Layer 130 may be implemented as parts of a single integrated circuit.

Each wireless device 104-$n$ may have a protocol stack 140. The protocol stack 140 may include a number of protocols, e.g., Logical Link Control Adaptation Protocol (L2CAP), which may perform segmentation and reassembly of data packets generated by one or more applications 103 operating on host device 102-$n$. Specifically, L2CAP may segment data packets of arbitrary size, as output by the application(s) 103, into packets of the size and format that can be processed by Link Layer 130. L2CAP may also perform error detection operations. The protocol stack 140 may also include generic access profile (GAP) and a generic attribute profile (GATT). GAP may specify how wireless device 104-$n$ advertises itself on the wireless network, discovers other network devices, and establishes wireless links with the discovered devices. The protocol stack 140 may further include a security manager (SM) that controls how pairing, signing, and encryption of data is performed. GATT may specify how a data exchange between wireless device 104-1 and wireless device 104-2 is to occur once the connection between the two devices is established. GATT may use attribute protocol (ATT) that specifies how units of data are transferred between devices. The protocol stack 140 may also be compliant with current and/or future BT and/or BLE standards. Wireless device 104-$n$ may also include other components not explicitly shown in FIG. 1, such as a host-controller interface.

Wireless device 104-$n$ may include one or more processing devices or controllers 150. In some implementations, controller(s) 150 may include one or more central processing units (CPUs), finite state machines (FSMs), field-programmable gate arrays (FPGAs), application-specific integrated circuits (ASIC), or the like. Controller(s) 150 may be a single processing device that executes various operations of managing data transfers that may be running on wireless device 104-n. In some implementations, wireless device 104-n may have a dedicated processor for managing data transfers that is separate from a processor that executes other operations on wireless device 104-n (e.g., processes associated with data transmission and reception).

Wireless device 104-n may also include a power management unit (PMU) 170, which manages clock/reset and power resources. Wireless device 104-n may further contain an input/output (I/O) controller 180 to enable communications with other external devices (including non-network devices) and structures. In some implementations, I/O controller 180 may enable a general-purpose I/O (GPIO) interface, a USB interface, a PCM digital audio module, and other I/O components.

Wireless device 104-n may further include a memory 160, which may be (or include) a non-volatile, e.g., read-only (ROM) memory, and volatile, e.g., random-access (RAM), memory. Memory 160 may store codes and supporting data for a parameter adjustment engine 162 that implements managing data transfers in wireless connections using connection event lengths. The parameter adjustment engine 162 may be executed by controller 150. In some implementations, the parameter adjustment engine 162 can obtain a connection event length for a wireless connection for a central device and a peripheral device. The parameter adjustment engine 162 can adjust a parameter using the connection event length to improve a quality of the wireless connection. In some implementations, the parameter can be a bandwidth utilization rate, and adjusting the parameter can increase the bandwidth utilization rate. In some implementations, the parameter adjustment engine 162 can adjust the parameter by adjusting a maximum data length that is set for the central device and/or peripheral device for transmitting and/or receiving data over the wireless connection, where the maximum data length is within the obtained connection event length. For example, the parameter adjustment engine 162 can reduce the maximum data length such that a data packet of a reduced size can be transmitted and/or received over the wireless connection. In some implementations, the parameter adjustment engine 162 can adjust a timing for a wireless link of the peripheral device based on a determined threshold offset between the timing for the wireless link of the peripheral device and a timing for a wireless link of the central device, such that the wireless link of the peripheral device and the wireless link of the central device can avoid a collision. In some implementations, the parameter adjustment engine 162 can create a new wireless link for the peripheral device based on the determined threshold offset, such that the wireless link of the peripheral device and the wireless link of the central device can avoid a collision. In some implementations, the parameter adjustment engine 162 can adjust the wireless link of the central device based on the determined threshold offset, such that the wireless link of the peripheral device and the wireless link of the central device can avoid a collision. In some implementations, the parameter adjustment engine 162 can identify one or more connection events between the central device and the peripheral device. The parameter adjustment engine 162 can adjust the timing of each of the identified connection events, e.g., by adjusting the timing of each connection event by a period of time (e.g., one or more microseconds) for each connection event such that the wireless link between the peripheral device and the wireless link of the central device can avoid a collision. Numerous other implementations and multiple variations of these implementations with regard to the parameter adjustment engine 162 are discussed below.

Figure 2:
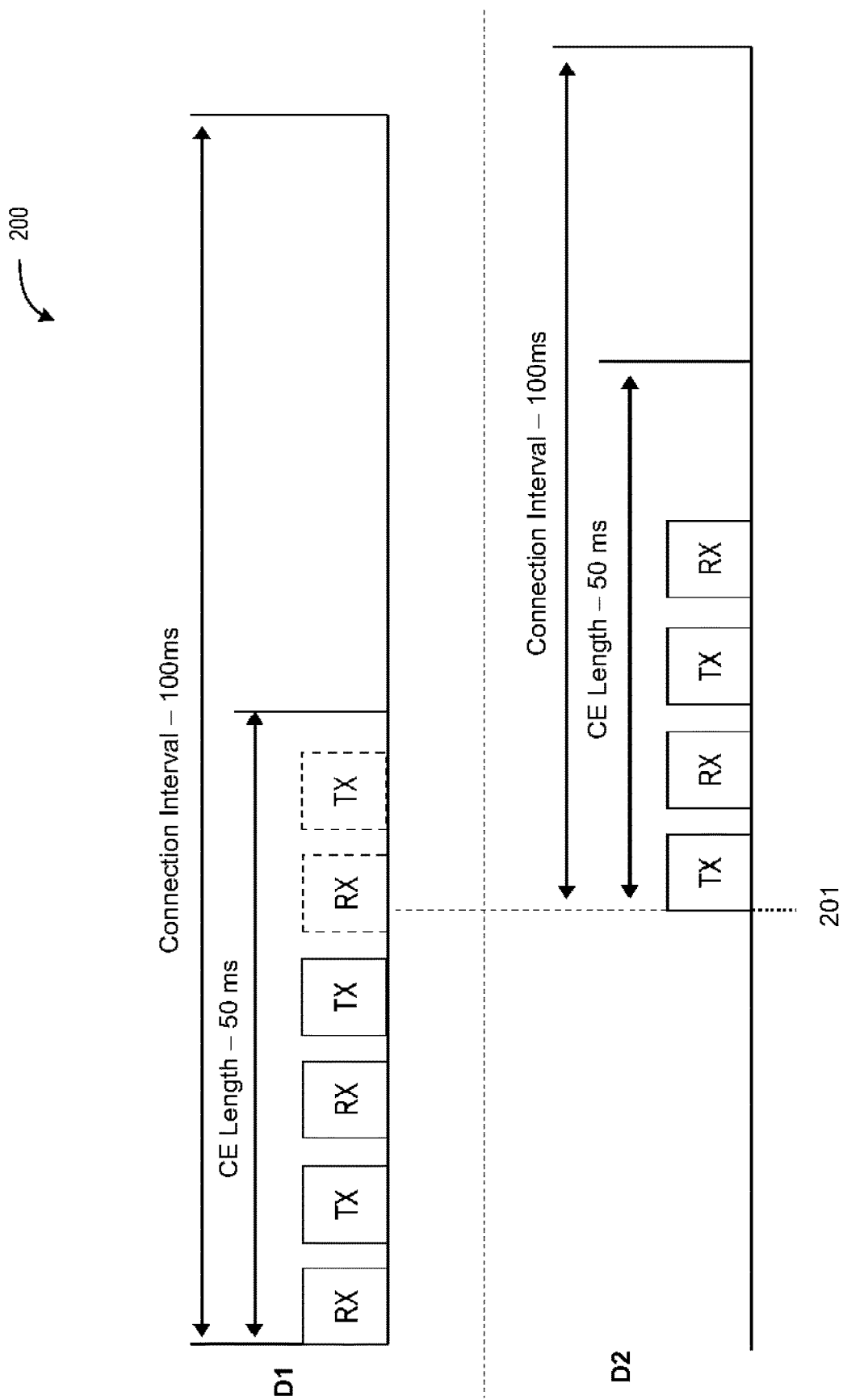
FIG. 2 is a block diagram illustrating an example link alignment between a wireless device acting as a CD and a wireless device acting as a PD, in accordance with some implementations.

FIG. 2 is a block diagram 200 illustrating an example link alignment between a wireless device acting as a CD and a wireless device acting as a PD, in accordance with some implementations. FIG. 2 is described in detail with respect to FIG. 4 herein below.

Figure 3:
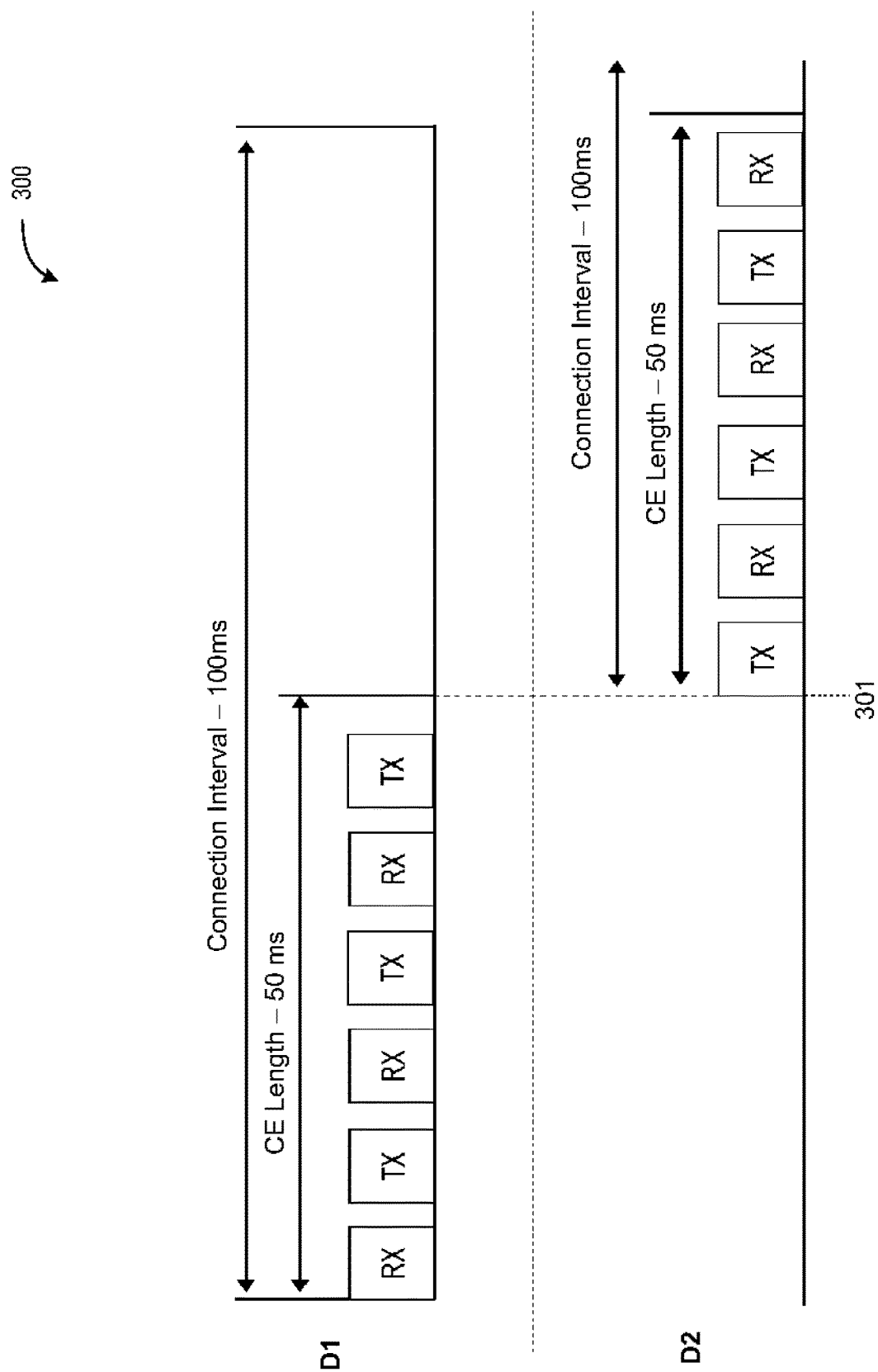
FIG. 3 is a block diagram illustrating an example link alignment between a wireless device acting as a CD and a wireless device acting as a PD, in accordance with some implementations.

FIG. 3 is a block diagram 300 illustrating an example link alignment between a wireless device acting as a CD and a wireless device acting as a PD, in accordance with some implementations. FIG. 3 is described in detail with respect to FIG. 4 herein below.

Figure 4:
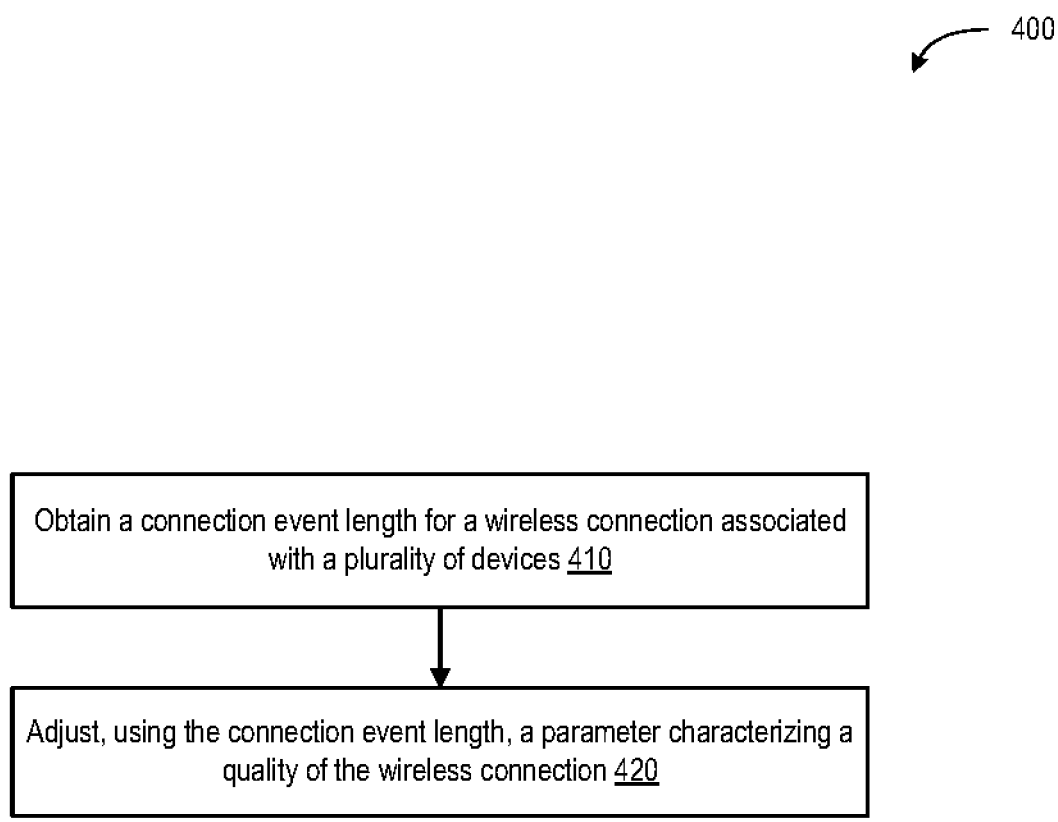
FIG. 4 is a flow diagram of an example method for managing data transfers in wireless connections using connection event lengths, in accordance with some implementations.

FIG. 4 is a flow diagram of an example method 400 for managing data transfers in wireless connections using connection event lengths, in accordance with some implementations. Multiple wireless devices of any given wireless network may perform method 400 in parallel (e.g., concurrently). Method 400 may be performed by a processing logic of a wireless device interacting with at least one other wireless device. The processing logic performing method 400 may include hardware (e.g., circuitry, dedicated logic, programmable logic, microcode, etc.), firmware, and/or software, or any combination thereof. In some implementations, method 400 may be performed by a controller 150 (or any other processing logic) of wireless device 104-2 of FIG. 1. The wireless controller 150 performing method 400 may receive data from radio 110, modem 120, and other components/modules. In some implementations, the processing logic performing method 400 may execute instructions of parameter adjustment engine 162. In certain implementations, method 400 may be performed by a single processing thread. Alternatively, method 400 may be performed by two or more processing threads, each thread executing one or more individual functions, routines, subroutines, or operations of the method. The processing threads implementing method 400 may be synchronized (e.g., using semaphores, critical sections, and/or other thread synchronization mechanisms). Alternatively, the processing threads implementing method 400 may be executed asynchronously with respect to each other. Various operations of method 400 may be performed in a different order compared with the order shown in FIG. 4. Some operations of method 400 may be performed concurrently with other operations. Some operations may be optional.

At block 410, method 400 may involve obtaining a connection event length for a wireless connection between a set of devices (e.g., a first device and a second device), where the first device can be a central device (e.g., wireless device 104-1 of FIG. 1) and the second device can be a peripheral device (e.g., wireless device 104-2 of FIG. 1). In some implementations, each device can be a BT device, BLE device, or any other personal area network device. In some implementations, the set of devices can be communicably coupled to a host device, e.g., host device 102-1 of the first network device 104-1 or host device 102-2 of the second network device 104-2 of FIG. 1. In some implementations, using FIG. 2 as an illustrative example, the connection event length obtained can be a period of time, such as 50 ms in FIG. 2, reserved for sending and/or receiving data packets from the central device or peripheral device within a particular connection interval (e.g., period of time reserved for sending and/or receiving data packets between the set of devices). In some implementations, the timing of a connection event (e.g., a data packet transfer) can be misaligned (i.e., it can conflict with the timing of another connection event). For example, as illustrated in FIG. 2, the timing of the connection event for device D1 (e.g., the central device) can overlap with the timing of the connection event for device D2 (e.g., the peripheral device), indicated by a dotted line 201. As described herein, the misalignment of timing between each connection event can result in collisions of data packets, causing a decrease in throughput and/or OTA bandwidth underutilization, among other issues.

In some implementations, obtaining the connection event length can include sending, by the central device, to the peripheral device, a request for a connection event length that is supported by the peripheral device. In some embodiments, the request can be sent (e.g., transmitted) to the peripheral device and include data specifying a maximum value and/or a minimum value of a connection event length supported by the central device. In some implementations, in response to sending the request, the central device can receive from the peripheral device a response, where the response can specify a maximum value and/or minimum value of the connection event length supported by the peripheral device. In response to receiving the response, the central device can determine, based at least in part on the response and the maximum value and the minimum value of the connection event length supported by the central device, the connection event length for the wireless connection. In some implementations, the central device can send (e.g., notify) the determined connection event length to the peripheral device. In some implementations, each of the request and/or response can be sent/received using one or more link-layer operation codes (also referred to as opcodes) (e.g., using the link layer 130 of FIG. 1). In some implementations, each of the request and/or response can be sent/received using a custom and/or application-specific method specified by the host (e.g., specified by the application 103 of FIG. 1). In some implementations, the maximum value of the connection event length and/or the minimum value of the connection event length supported by the central device and/or the peripheral device can be determined (e.g., set, assigned, computed, etc.) by a custom and/or application-specific method specified by the host (e.g., specified by the application 103 of FIG. 1).

In some implementations, obtaining the connection event length can include sending, by the peripheral device, to the central device, a request for the connection event length for the wireless connection. In some implementations, in response to sending the response, the peripheral device can receive from the central device a response, wherein the response can include data specifying the connection event length. In some implementations, each of the request and/or response can be sent/received using one or more link-layer operation codes (also referred to as opcodes) (e.g., using the link layer 130 of FIG. 1). In some implementations, each of the request and/or response can be sent/received using a custom and/or application-specific method specified by the host (e.g., specified by the application 103 of FIG. 1).

In some implementations, obtaining the connection event length can include sending, by the peripheral device, to the central device, a request for an update to the connection event length. The request for the update can include a maximum value and a minimum value of a connection event length supported by the peripheral device. In some implementations, in response to sending the request for the update, the peripheral device can receive from the central device a response. The response can include data specifying the connection event length. In some implementations, the peripheral device can receive the connection event length after the central device updates the connection event length in response to receiving the request to update the connection event length from the peripheral device. For example, the central device can determine, based at least in part on the request and the maximum value and the minimum value of the connection event length supported by the central device, whether to update the connection event length for the wireless connection. In some implementations, each of the request and/or response can be sent/received using one or more link-layer operation codes (also referred to as opcodes) (e.g., using the link layer 130 of FIG. 1). In some implementations, each of the request and/or response can be sent/received using a custom and/or application-specific method specified by the host (e.g., specified by the application 103 of FIG. 1). In some implementations, the maximum value of the connection event length and/or the minimum value of the connection event length supported by the central device and/or the peripheral device can be determined (e.g., set, assigned, computed, etc.) by a custom and/or application-specific method specified by the host (e.g., specified by the application 103 of FIG. 1).

At block 420, method 400 may include adjusting a parameter characterizing a quality of the wireless connection. In some implementations, the parameter can be adjusted using the connection event length obtained at block 410. In some implementations, the parameter can be a bandwidth utilization rate, and adjusting the parameter can increase an OTA bandwidth utilization rate of the wireless connection. In some implementations, using FIG. 3 as an illustrative example, adjusting the parameter characterizing the quality of the wireless connection can include aligning and/or scheduling links between connection events between the central device and the peripheral device to avoid conflicts and thus collisions of data packets, which can improve throughput and increase OTA bandwidth utilization. For example, as illustrated in FIG. 3, and in contrast to FIG. 3, the timing of the connection event for device D1 (e.g., the central device) can be aligned with the timing of the connection event for device D2 (e.g., the peripheral device), indicated by a dotted line 301, such that there is no overlap as in FIG. 2 described above. In some implementations, adjusting the parameter characterizing the quality of the wireless connection can be performed by a custom and/or application-specific method specified by the host (e.g., specified by the application 103 of FIG. 1).

In some implementations, adjusting the parameter can include adjusting a maximum data length set for/assigned to the central device and/or peripheral device for transmitting and/or receiving data over the wireless connection, where the maximum data length is within the obtained connection event length. For example, the wireless controller can reduce the maximum data length such that a data packet of a reduced size can be transmitted and/or received over the wireless connection. In some implementations, the maximum data length can be determined (e.g., set, assigned, computed, etc.) by a custom and/or application-specific method specified by the host (e.g., specified by the application 103 of FIG. 1).

In some implementations, the wireless controller can adjust a timing for a wireless link of the peripheral device. In some implementations, the wireless controller can determine a threshold offset between the timing for the wireless link of the peripheral device and a timing for a wireless link of the central device, such that the wireless link of the peripheral device and the wireless link of the central device can be aligned and avoid collisions. In some embodiments, the threshold offset can be a value at which a number of collisions is within a threshold number of collisions (e.g., a reduced number of collisions, no collisions, etc.). In some embodiments, the threshold number of collisions can be set by the host and/or by device requirements and/or by customer requirements, etc. In some implementations, the threshold number of collisions can be determined (e.g., set, assigned, computed, etc.) by a custom and/or application-specific method specified by the host (e.g., specified by the application 103 of FIG. 1).

In some implementations, the wireless controller can create a new wireless link for the peripheral device based on the determined threshold offset, such that the wireless link of the peripheral device and the wireless link of the central device can be aligned and avoid collisions.

In some implementations, the wireless controller can adjust the wireless link of the central device based on the determined threshold offset, such that the wireless link of the peripheral device and the wireless link of the central device can be aligned and avoid collisions.

In some implementations, the wireless controller can identify one or more connection events between the central device and the peripheral device. The wireless controller can adjust the timing of each of the identified connection events, e.g., by adjusting (e.g., delaying, dragging, etc.) the timing of each connection event by a period of time (e.g., one or more microseconds) for each connection event such that the wireless link between the peripheral device and the wireless link of the central device can be aligned and avoid collisions.

Figure 5:
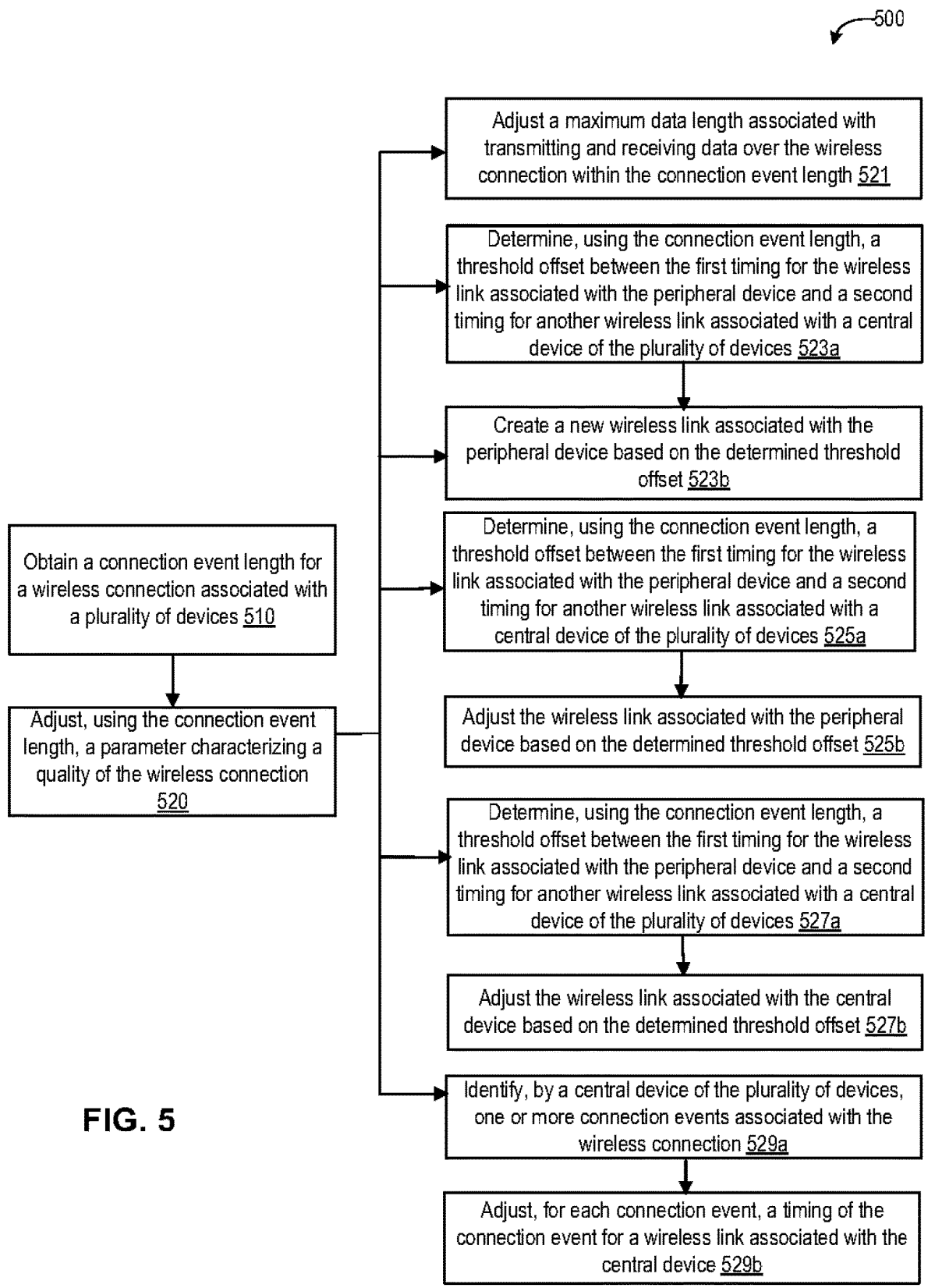
FIG. 5 is a flow diagram of an example method for managing data transfers in wireless connections using connection event lengths, in accordance with some implementations.

FIG. 5 is a flow diagram of an example method 500 for managing data transfers in wireless connections using connection event lengths, in accordance with some implementations. Multiple wireless devices of any given wireless network may perform method 500 in parallel (e.g., concurrently). Method 500 may be performed by a processing logic of a wireless device interacting with at least one other wireless device. The processing logic performing method 500 may include hardware (e.g., circuitry, dedicated logic, programmable logic, microcode, etc.), firmware, and/or software, or any combination thereof. In some implementations, method 500 may be performed by a controller 150 (or any other processing logic) of wireless device 104-2 of FIG. 1. The wireless controller 150 performing method 400 may receive data from radio 110, modem 120, and other components/modules. In some implementations, the processing logic performing method 500 may execute instructions of parameter adjustment engine 162. In certain implementations, method 500 may be performed by a single processing thread. Alternatively, method 500 may be performed by two or more processing threads, each thread executing one or more individual functions, routines, subroutines, or operations of the method. The processing threads implementing method 500 may be synchronized (e.g., using semaphores, critical sections, and/or other thread synchronization mechanisms). Alternatively, the processing threads implementing method 500 may be executed asynchronously with respect to each other. Various operations of method 500 may be performed in a different order compared with the order shown in FIG. 5. Some operations of method 500 may be performed concurrently with other operations. Some operations may be optional.

At block 510, method 500 may involve obtaining a connection event length for a wireless connection between a set of devices (e.g., a first device and a second device), where the first device can be a central device (e.g., wireless device 104-1 of FIG. 1) and the second device can be a peripheral device (e.g., wireless device 104-2 of FIG. 1). In some implementations, each device can be a BT device, BLE device, or any other personal area network device. In some implementations, the set of devices can be communicably coupled to a host device, e.g., host device 102-1 of the first network device 104-1 or host device 102-2 of the second network device 104-2 of FIG. 1.

In some implementations, obtaining the connection event length can include sending, by the central device, to the peripheral device, a request for a connection event length that is supported by the peripheral device. In some embodiments, the request can be sent (e.g., transmitted) to the peripheral device and include data specifying a maximum value and/or a minimum value of a connection event length supported by the central device. In some implementations, in response to sending the request, the central device can receive from the peripheral device a response, where the response can specify a maximum value and/or minimum value of the connection event length supported by the peripheral device. In response to receiving the response, the central device can determine, based at least in part on the response and the maximum value and the minimum value of the connection event length supported by the central device, the connection event length for the wireless connection. In some implementations, the central device can send (e.g., notify) the determined connection event length to the peripheral device. In some implementations, the timing of a connection event (e.g., a data packet transfer) can be misaligned (i.e., it can conflict with the timing of another connection event). For example, as illustrated in FIG. 2, the timing of the connection event for device D1 (e.g., the central device) can overlap with the timing of the connection event for device D2 (e.g., the peripheral device), indicated by a dotted line 201. As described herein, the misalignment of timing between each connection event can result in collisions of data packets, causing a decrease in throughput and/or OTA bandwidth underutilization, among other issues. In some implementations, the maximum value of the connection event length and/or the minimum value of the connection event length supported by the central device and/or the peripheral device can be determined (e.g., set, assigned, computed, etc.) by a custom and/or application-specific method specified by the host (e.g., specified by the application 103 of FIG. 1).

In some implementations, obtaining the connection event length can include sending, by the central device, to the peripheral device, a request for a connection event length that is supported by the peripheral device. In some embodiments, the request can be sent (e.g., transmitted) to the peripheral device and include data specifying a maximum value and/or a minimum value of a connection event length supported by the central device. In some implementations, in response to sending the request, the central device can receive from the peripheral device a response, where the response can specify a maximum value and/or minimum value of the connection event length supported by the peripheral device. In response to receiving the response, the central device can determine, based at least in part on the response and the maximum value and the minimum value of the connection event length supported by the central device, the connection event length for the wireless connection. In some implementations, the central device can send (e.g., notify) the determined connection event length to the peripheral device. In some implementations, each of the request and/or response can be sent/received using one or more link-layer operation codes (also referred to as opcodes) (e.g., using the link layer 130 of FIG. 1). In some implementations, each of the request and/or response can be sent/received using a custom and/or application-specific method specified by the host (e.g., specified by the application 103 of FIG. 1). In some implementations, the maximum value of the connection event length and/or the minimum value of the connection event length supported by the central device and/or the peripheral device can be determined (e.g., set, assigned, computed, etc.) by a custom and/or application-specific method specified by the host (e.g., specified by the application 103 of FIG. 1).

In some implementations, obtaining the connection event length can include sending, by the peripheral device, to the central device, a request for the connection event length for the wireless connection. In some implementations, in response to sending the response, the peripheral device can receive from the central device a response, wherein the response can include data specifying the connection event length. In some implementations, each of the request and/or response can be sent/received using one or more link-layer operation codes (also referred to as opcodes) (e.g., using the link layer 130 of FIG. 1). In some implementations, each of the request and/or response can be sent/received using a custom and/or application-specific method specified by the host (e.g., specified by the application 103 of FIG. 1).

In some implementations, obtaining the connection event length can include sending, by the peripheral device, to the central device, a request for an update to the connection event length. The request for the update can include a maximum value and a minimum value of a connection event length supported by the peripheral device. In some implementations, in response to sending the request for the update, the peripheral device can receive from the central device a response. The response can include data specifying the connection event length. In some implementations, the peripheral device can receive the connection event length after the central device updates the connection event length in response to receiving the request to update the connection event length from the peripheral device. For example, the central device can determine, based at least in part on the request and the maximum value and the minimum value of the connection event length supported by the central device, whether to update the connection event length for the wireless connection. In some implementations, each of the request and/or response can be sent/received using one or more link-layer operation codes (also referred to as opcodes) (e.g., using the link layer 130 of FIG. 1). In some implementations, each of the request and/or response can be sent/received using a custom and/or application-specific method specified by the host (e.g., specified by the application 103 of FIG. 1). In some implementations, the maximum value of the connection event length and/or the minimum value of the connection event length supported by the central device and/or the peripheral device can be determined (e.g., set, assigned, computed, etc.) by a custom and/or application-specific method specified by the host (e.g., specified by the application 103 of FIG. 1).

At block 520, method 500 may include adjusting a parameter characterizing a quality of the wireless connection. In some implementations, the parameter can be adjusted using the connection event length obtained at block 510. In some implementations, the parameter can be a bandwidth utilization rate, and adjusting the parameter can increase an OTA bandwidth utilization rate of the wireless connection. In some implementations, using FIG. 3 as an illustrative example, adjusting the parameter characterizing the quality of the wireless connection can include aligning and/or scheduling links between connection events between the central device and the peripheral device to avoid conflicts and thus collisions of data packets, which can improve throughput and increase OTA bandwidth utilization. For example, as illustrated in FIG. 3, and in contrast to FIG. 3, the timing of the connection event for device D1 (e.g., the central device) can be aligned with the timing of the connection event for device D2 (e.g., the peripheral device), indicated by a dotted line 301, such that there is no overlap as in FIG. 2 described above. In some implementations, adjusting the parameter characterizing the quality of the wireless connection can be performed by a custom and/or application-specific method specified by the host (e.g., specified by the application 103 of FIG. 1).

At block 521, adjusting the parameter can include adjusting a maximum data length set for/assigned to the central device and/or peripheral device for transmitting and/or receiving data over the wireless connection, where the maximum data length is within the obtained connection event length. For example, the wireless controller can reduce the maximum data length such that a data packet of a reduced size can be transmitted and/or received over the wireless connection. In some implementations, the maximum data length can be determined (e.g., set, assigned, computed, etc.) by a custom and/or application-specific method specified by the host (e.g., specified by the application 103 of FIG. 1).

At blocks 523*a*-523*b*, adjusting the parameter can include determining a threshold offset between the timing for the wireless link of the peripheral device and a timing for a wireless link of the central device, such that the wireless link of the peripheral device and the wireless link of the central device can be aligned and avoid collisions. In some embodiments, the threshold offset can be a value at which a number of collisions is within a threshold number of collisions (e.g., a reduced number of collisions, no collisions, etc.) In some embodiments, the threshold number of collisions can be set by the host and/or by device requirements and/or by customer requirements, etc. In some implementations, the wireless controller can create a new wireless link for the peripheral device based on the determined threshold offset. In some implementations, the threshold number of collisions can be determined (e.g., set, assigned, computed, etc.) by a custom and/or application-specific method specified by the host (e.g., specified by the application 103 of FIG. 1).

At blocks 525*a*-525*b*, adjusting the parameter can include adjusting the wireless link of the peripheral device based on the determined threshold offset, such that the wireless link of the peripheral device and the wireless link of the central device can be aligned and avoid collisions.

At blocks 527*a*-527*b*, adjusting the parameter can include adjusting the wireless link of the central device based on the determined threshold offset, such that the wireless link of the peripheral device and the wireless link of the central device can be aligned and avoid collisions.

At blocks 529*a*-529*b*, adjusting the parameter can include identifying one or more connection events between the central device and the peripheral device. The wireless controller can adjust the timing of each of the identified connection events, e.g., by adjusting the timing of each connection event by a period of time (e.g., one or more microseconds) for each connection event such that the wireless link between the peripheral device and the wireless link of the central device can be aligned and avoid collisions.

It should be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but may be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

The implementations of methods, hardware, software, firmware or code set forth above may be implemented via instructions or code stored on a machine-accessible, machine-readable, computer-accessible, or computer-readable medium which are executable by a processing element. "Memory" includes any mechanism that provides (i.e., stores and/or transmits) information in a form readable by a machine, such as a computer or electronic system. For example, "memory" includes random-access memory (RAM), such as static RAM (SRAM) or dynamic RAM (DRAM); ROM; magnetic or optical storage medium; flash memory devices; electrical storage devices; optical storage devices; acoustical storage devices, and any type of tangible machine-readable medium suitable for storing or transmitting electronic instructions or information in a form readable by a machine (e.g., a computer).

Reference throughout this specification to "one implementation" or "an implementation" means that a particular feature, structure, or characteristic described in connection with the implementation is included in at least one implementation of the disclosure. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

In the foregoing specification, a detailed description has been given with reference to specific exemplary implementations. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of implementation, implementation, and/or other exemplarily language does not necessarily refer to the same implementation or the same example, but may refer to different and distinct implementations, as well as potentially the same implementation.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "of" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" or "an implementation" or "one implementation" throughout is not intended to mean the same implementation or implementation unless described as such. Also, the terms "first," "second," "third," "fourth," etc. as used herein are meant as labels to distinguish among different elements and may not necessarily have an ordinal meaning according to their numerical designation.

What is claimed is:

1. A method comprising:
   obtaining, by a central device of a plurality of devices, a connection event length for a wireless connection associated with the plurality of devices, the connection event length being determined based on an exchange of maximum and minimum connection event lengths supported by the central device and a peripheral device of the plurality of devices; and
   adjusting, using the connection event length, a parameter characterizing a quality of the wireless connection.

2. The method of claim 1, wherein adjusting the parameter characterizing the quality of the wireless connection comprises:
   adjusting a maximum data length associated with transmitting and receiving data over the wireless connection within the connection event length.

3. The method of claim 1, wherein adjusting the parameter characterizing the quality of the wireless connection comprises:
   adjusting a first timing for a wireless link associated with the peripheral device of the plurality of devices.

4. The method of claim 3, further comprising:
   determining, using the connection event length, a threshold offset between the first timing for the wireless link associated with the peripheral device and a second timing for another wireless link associated with a central device of the plurality of devices; and
   creating a new wireless link associated with the peripheral device based on the determined threshold offset.

5. The method of claim 3, further comprising:
   determining, using the connection event length, a threshold offset between the first timing for the wireless link associated with the peripheral device and a second timing for another wireless link associated with a central device of the plurality of devices; and
   adjusting the wireless link associated with the peripheral device based on the determined threshold offset.

6. The method of claim 3, further comprising:
   determining, using the connection event length, a threshold offset between the first timing for the wireless link associated with the peripheral device and a second timing for another wireless link associated with a central device of the plurality of devices; and
   adjusting the wireless link associated with the central device based on the determined threshold offset.

7. The method of claim 3, further comprising:
   identifying, by a central device of the plurality of devices, one or more connection events associated with the wireless connection; and
   adjusting, for each connection event, a timing of the connection event for a wireless link associated with the central device.

8. The method of claim 1, wherein the parameter characterizing the quality of the wireless connection comprises a bandwidth utilization rate, and wherein adjusting the parameter increases the bandwidth utilization rate.

9. The method of claim 1, wherein obtaining the connection event length comprises:
   sending, by a central device of the plurality of devices, to the peripheral device of the plurality of devices, a request for a connection event length associated with the peripheral device, wherein the request comprises the maximum value and minimum connection event length supported by the central device;

receiving, from the peripheral device, a response comprising the maximum and minimum connection event length supported by the peripheral device;

determining, based at least in part on the response, the connection event length for the wireless connection; and sending, to the peripheral device, the connection event length for the wireless connection.

10. The method of claim 1, wherein obtaining the connection event length comprises:

sending, by the peripheral device of the plurality of devices, to a central device of the plurality of devices, a request for the connection event length; and receiving, by the peripheral device, a response comprising the connection event length.

11. The method of claim 1, wherein obtaining the connection event length comprises:

sending, by the peripheral device of the plurality of devices, to a central device of the plurality of devices, a request for an update to the connection event length, wherein the request comprises the maximum value and minimum connection event length supported by the peripheral device; and receiving, from the central device, a response comprising the connection event length, wherein the connection event length is adjusted in response to the request from the peripheral device based at least in part on the maximum and minimum connection event length supported by the peripheral device.

12. A system comprising:
a wireless device comprising:
  a radio comprising one or more antennas; and
  a wireless controller configured to:
    obtain a connection event length for a wireless connection associated with the wireless device, the connection event length being determined based on an exchange of maximum and minimum connection event lengths supported by the wireless device and a peripheral device; and
    adjust, using the connection event length, a parameter characterizing a quality of the wireless connection.

13. The system of claim 12, wherein adjusting the parameter characterizing the quality of the wireless connection comprises:
  adjusting a maximum data length associated with transmitting and receiving data over the wireless connection within the connection event length.

14. The system of claim 12, wherein adjusting the parameter characterizing the quality of the wireless connection comprises:
  adjust a first timing for a wireless link associated with the wireless device.

15. The system of claim 14, wherein the wireless controller is further configured to:
  determine, using the connection event length, a threshold offset between the first timing for the wireless link associated with the wireless device and a second timing associated with another device connected to the wireless device, wherein the other device is central to the wireless device; and
  create a new wireless link associated with the wireless device based on the determined threshold offset.

16. The system of claim 14, wherein the wireless controller is further configured to:
  determine, using the connection event length, a threshold offset between the first timing for the wireless link associated with the wireless device and a second timing associated with another device connected to the wireless device, wherein the other device is central to the wireless device; and
  adjust the wireless link associated with the wireless device based on the determined threshold offset.

17. The system of claim 12, wherein the parameter characterizing the quality of the wireless connection comprises a bandwidth utilization rate, and wherein adjusting the parameter increases the bandwidth utilization rate.

18. A wireless device comprising:
a radio; and
a wireless controller configured to:
  obtain a connection event length for a wireless connection associated with the wireless device, the connection event length being determined based on an exchange of maximum and minimum connection event lengths supported by the wireless device and a peripheral device; and
  adjust, using the connection event length, a parameter characterizing a quality of the wireless connection.

19. The wireless device of claim 18, wherein adjusting the parameter characterizing the quality of the wireless connection comprises:
  adjust a maximum data length associated with transmitting and receiving data over the wireless connection within the connection event length.

20. The wireless device of claim 18, wherein adjusting the parameter characterizing the quality of the wireless connection comprises:
  adjust a first timing for a wireless link associated with the wireless device.

* * * * *